United States Patent Office 3,210,281
Patented Oct. 5, 1965

3,210,281
LUBRICANT COMPOSITION CONTAINING
METHYLPHENYL-α-NAPHTHYLAMINES
Robert L. Peeler, Albany, Calif., assignor to California
Research Corporation, San Francisco, Calif., a corporation of Delaware
No Drawing. Filed July 30, 1962, Ser. No. 213,132
4 Claims. (Cl. 252—50)

This invention relates to lubricant compositions. More particularly, it relates to lubricants containing N-alkylphenyl-α-naphthylamine antioxidants having a total of up to 6 carbon atoms substituted on the phenyl radical and possessing superior nonsludging properties.

Prior art antioxidants such as N-phenyl-α-naphthylamine have been extensively used in lubricating oils. However, the above compound suffers from a tendency to precipitate in the form of a polymer. The polymeric deposits are very detrimental, especially in oils and greases used in close tolerance machinery. Further, the tendency of the inhibitor to form sludges often causes clogging of oil ports in circulating oil systems. Additionally, the antioxidant sludge, which forms a visible precipitate, gives a poor appearance to the oils.

It has now been found that N-lower-alkylphenyl-α-naphthylamines having a total of up to 6 carbon atoms on the phenyl radical are excellent oxidation inhibitors and are essentially nonsludging in lubricating oils and greases. In nearly every respect this new class of compounds is superior to the old type of antioxidants.

Thus, the present invention involves a lubricating oil or a grease containing as a nonsludging antioxidant in an amount sufficient to inhibit oxidation N-alkylphenyl-α-napthylamines selected from at least one of the compounds from the group consisting of N-2,4,6-trialkylphenyl-α-naphthylamines and N-2,6-dialkylphenyl-α-naphthylamines wherein the alkyl groups are methyl and ethyl.

Further, the invention involves a lubricating oil or grease containing as a nonsludging antioxidant in an amount sufficient to inhibit oxidation N-2,4,6-trialkylphenyl-α-naphthylamines wherein the alkyl groups are methyl and ethyl. The preferred species is N-2,4,6-trimethylphenyl-α-naphthylamine.

Still further, the invention involves a lubricating oil or a grease containing as a nonsludging antioxidant in an amount sufficient to inhibit oxidation N-2,6-dialkylphenyl-α-naphthylamine wherein the alkyl groups are of from 1 to 2 carbon atoms.

The compounds of the present invention are prepared by reacting an alkyl substituted aniline with α-naphthylamine. These reactions are suitably carried out by conventional methods which are well known to those skilled in the art.

As mentioned before, the compounds of the present invention are found to be superior to phenyl-α-naphthylamine, which, although an effective and widely accepted oxidation inhibitor, precipitates a yellow sludge on mild oxidation in either oil or silicate base lubricants. This precipitate occurs even in white oil, which does not contribute to the sludge itself. Infrared, ultraviolet and elemental analyses of the precipitate shows it to be a polymer derived from the inhibitor rather than from the oil.

A combination of an induction period in 340° F. uncatalyzed oxidator test and a time to appearance of a precipitate on sunlight exposure in typical mineral oil base compositions was chosen to measure both antioxidant and nonsludging qualities of the lubricant. In the oxidator test a stirred sample of the oil is kept saturated with oxygen at a temperature of about 340° F., and the time in hours for 100 g. of oil to absorb 1000 ml. of oxygen is observed. In the sunlight exposure test the samples in conventional 4-oz. laboratory bottles are observed every 24-hour day and the time in days noted for the first appearance of cloudiness or precipitate.

The test data given below embody the above-described procedures. N-phenyl-α-naphthylamine was compared with the claimed compounds. All of the compounds were employed in concentrations of 10 mM./kg. of medicinal grade white oil.

*Table I*

| Additive | Oxidation Life, Hours | Sunlight Life, Days |
|---|---|---|
| N-phenyl-α-naphthylamine | 4.6 | 3 |
| N-2,6-dimethylphenyl-α-naphthylamine | 4.8 | 10 |
| N-2,4,6-trimethylphenyl-α-naphthylamine | 5.2 | 15 |

The data show oxidation life of the methyl substituted compounds to be surprisingly superior to the unsubstituted N-phenyl-α-naphthylamine. Sunlight life of the N-alkylphenyl-α-naphthylamines is even more superior to the conventional N-phenyl-α-naphthylamine.

The following test further illustrates the effectiveness of the new superior antioxidants. In this test the stability of turbine oil was determined according to ASTM Standard Method D943–54. Using this method, the test was stopped when the acid number exceeded about 2.0. The acid number was found according to ASTM Standard Method D974. The insolubles were found by filtering the used oil through a Whatman No. 2 filter paper. The precipitate was washed with hexanes and dried.

The table illustrates a comparison of N-phenyl-α-naphthylamine with N-2,4,6-trimethylphenyl-α-naphthylamine. The tests were of 36 grade turbine base oil using solvent refined bright stock plus 0.06% alkenyl succinic acid rust inhibitor plus 0.005% dimethyl silicone foam inhibitor.

*Table II*

| Inhibitor | N-Phenyl-α-Naphthylamine | N-2,4,6-Trimethylphenyl-α-Naphthylamine |
|---|---|---|
| Amount of inhibitor in oil, percent | .5 | .5 |
| Hours until test terminated | 768 | 792 |
| Acid number at termination of test | 2.52 | 2.68 |
| Insolubles, mg | 90 | 31 |
| Percent nitrogen in insolubles | 3.25 | 2.02 |

As illustrated above, the amount of insolubles is considerably less using the improved oil composition. The oil composition containing the old N-phenyl-α-naphthyl inhibitor was roughly about three times poorer. If the percent of nitrogen impurities is taken into consideration, then the actual percent attributable to the formed polymer is even greater with the old additive.

Ordinarily, a major proportion of lubricating oil is employed in combination with a minor amount of inhibitor sufficient to inhibit oxidation. Preferably, the amount of inhibitor in oil will vary from about 0.05% to about 5.0%. The effective amount, however, can easily be determined by those skilled in the art.

The inhibitors of this invention are used with good effect in any of a wide variety of oils of lubricating viscosity or of blends of such oils. Thus the base oil can be mineral lubricating oil of either paraffinic or naphthenic types. Synthetic lubricating oils may also be used, including alkylene oxide polymers such as the 2-ethylhexanol-initiated polymer of propylene oxide and/or ethylene oxide. Esters of carboxylic acids, such as di-(2-ethylhexyl)sebacate are also suitable. If desired, the base oil can be a mixture of mineral oils and/or synthetic oils. The preferred oils for present purposes are mineral lubricating oils.

The inhibitors of this invention are also useful in lubricant compositions in combination with other additives such as pour point depressants, oiliness and extreme pressure agents, detergents, viscosity index improvers, soap thickening agents of the type employed in greases, as well as other conventional additives. Illustrative additives of these types include the polyalkyl methacrylate and dialkyl fumarate pour point depressant, tricresyl phosphate oiliness agent, octadecenyl amine salt of mixed mono- and di-dodecyl phosphate extreme pressure agent, polydodecyl methacrylate viscosity index improvers, calcium petroleum sulfonate detergents, polyglycol substituted polymeric dispersants and calcium stearate grease thickeners.

According to the present invention, the antioxidants may be admixed with oil to form concentrates. The concentrate can be later diluted to form the finished product.

I claim:

1. A lubricating composition consisting essentially of a lubricating oil base and a minor amount, sufficient to inhibit oxidation of a substituted diaryl amine, selected from the group consisting of N-2,4,6-trimethylphenyl-α-naphthylamine and N-2,6-dimethylphenyl-α-naphthylamine.

2. The lubricating composition of claim 1, wherein the substituted diaryl amine is N-2,4,6-trimethylphenyl-α-naphthylamine.

3. The lubricating composition of claim 1, wherein the substituted diaryl amine is N-2,6-dimethylphenyl-α-naphthylamine.

4. The lubricating composition of claim 1 wherein the diaryl amine is present in the amount of from 0.05 to 5.0% by weight.

References Cited by the Examiner
UNITED STATES PATENTS

| | | | |
|---|---|---|---|
| 2,009,480 | 7/35 | Craig | 252—50 X |
| 3,019,191 | 1/62 | Furby et al. | 252—401 X |

OTHER REFERENCES

Cohen et al.: "Aliphatic Esters," I. and E. Chem., August 1953, pages 1766–1767 pertinent.

DANIEL E. WYMAN, *Primary Examiner.*

JULIUS GREENWALD, *Examiner.*